United States Patent [19]

Williams et al.

[11] Patent Number: 5,379,947
[45] Date of Patent: Jan. 10, 1995

[54] PROCESS FOR PRODUCING A POWDER COATING COMPOSITION

[75] Inventors: Charles F. Williams, Rochester Hills; Michael A. Gessner, West Bloomfield, both of Mich.

[73] Assignee: BASF Corporation, Southfield, Mich.

[21] Appl. No.: 149,425

[22] Filed: Nov. 9, 1993

[51] Int. Cl.$^6$ .............................................. B02C 23/18
[52] U.S. Cl. ........................................ 241/21; 241/22; 241/23
[58] Field of Search ...................... 241/16, 21, 22, 23, 241/17, 26, 27, 29

[56] References Cited

U.S. PATENT DOCUMENTS

| | | | |
|---|---|---|---|
| 3,389,105 | 6/1968 | Bolger et al. | 241/16 X |
| 3,787,230 | 1/1974 | Hoffman et al. | 117/102 A |
| 3,925,580 | 12/1975 | Brewer | 427/372 |
| 3,953,643 | 4/1976 | Cheung et al. | 428/220 |
| 4,137,349 | 1/1979 | Sakakibara et al. | 427/380 |
| 4,263,352 | 4/1981 | Kaltenbach et al. | 427/379 |
| 4,318,747 | 3/1982 | Ishijima et al. | 241/16 X |
| 4,884,754 | 12/1989 | Kemp, Jr. et al. | 241/21 X |
| 5,156,343 | 10/1992 | Sueyoshi et al. | 241/21 X |

FOREIGN PATENT DOCUMENTS 3240958 10/1988 Japan ........................... 241/16

*Primary Examiner*—Timothy V. Eley
*Attorney, Agent, or Firm*—Anne Gerry Sabourin

[57] ABSTRACT

A process for producing a powder coating composition having powder particles wherein at least 50% of the particles are of a size between 3 and 5 microns and 100% of the particles are of a size $\leq 10$ microns. The process includes the steps of preparing a powder coating extrudate, reducing the extrudate to flake, jet milling the powder coating to a powder wherein at least 50% of the particles are a particle size of between 3 and 5 microns and 100% of the particles are of a size less than or equal to 10 microns, and adding the powder to a mixture of water and surfactant. Dispersant and rheology control agents are then added to the mixture.

20 Claims, No Drawings

PROCESS FOR PRODUCING A POWDER COATING COMPOSITION

FIELD OF THE INVENTION

This invention relates to powder slurry coating compositions, and particularly to such compositions used for automotive coating compositions.

BACKGROUND OF THE INVENTION

Powder slurry coatings provide the most desirable appearance with respect to smoothness of surface and gloss when prepared with powder coatings having the smallest average particle size attainable. Generally, in coatings known in the art, the average particle sizes range from 4 to 30 microns. While the art teaches that resin particles used for powder slurry coatings range in average particle size between 0.5 microns and 80 microns, it would be expected in the art that only 2 to 6% of the particles have a particle size of between 3 and 5 microns and 3 to 8% of the particles have a particle size of 10 microns. It is desirable that 100% of the particles are of a size less than or equal to 10 microns and at least 50% of the particles have a particle size of between 3 and 5 microns.

It is well known in the art to prepare a powder slurry by dispersing the pulverized powder coating into a mixture of water and surfactant. In some instances water soluble binder resins are used to disperse the powder. The mixture is then run through a mill to reduce the particles size of the coating. To this mixture water and dispersants are added. Generally, in the prior art, powder coatings produced according to this method have a particle size ranging between 5 and 105 microns at the start of the process. The larger particles are reduced by using a ball mill, sand mill, or Attritor (trademark of Attritor Company for a piece of grinding equipment providing fast, fine grinding), to reduce the particle size of the coating to achieve the best smoothness. It is difficult to achieve average particle sizes smaller than 18 microns with conventional grinding equipment including hammer and ACM mills, as these build up significant amounts of heat and require liquid nitrogen or other means to control heat build up.

Jet milling is known in the art for the production of toners and other very fine particle ink products. Generally jet milling is not utilized in the powder coating industry, as particles smaller than 20 microns tend to agglomerate in powder coatings. Fine powders are difficult to spray as they agglomerate into larger particles. Further, the resulting finish is very rough due to this agglomeration. When combining fine powders with water to make a powder slurry the powder is difficult to wet out in water and the resulting mixture tends to have powder floating on the surface with very little of the powder wetting out in the water. The little powder that does get into the water tends to have a "false body", which is a consistency of whipped cream or shaving cream. Also, the water and powder mixture can be formed only at low concentrations of solids. The resulting slurry obtained by this mixture is not sprayable.

The present invention provides a method for producing a powder slurry coating having an average particle size of less than 10 microns, wherein at least 50% of the particles are of a size of between 3 and 5 microns. This powder slurry coating does not require a grinding step once the coating is formed. Further, the method of the present invention solves the problems of particle agglomeration, low solids content and low viscosity. The slurry coatings do not use water soluble binders or solvents to form a film. The resultant coatings provide a very smooth film with a high degree of gloss.

SUMMARY OF THE INVENTION

The present invention provides a method for the production of a powder slurry clearcoat composition comprising the steps of
(a) preparing a powder clear coat extrudate;
(b) chilling and forming the extrudate into a sheet;
(c) reducing the extrudate to a flake;
(d) jet milling the flake to a powder wherein the particles have a particle size of between 3 and 10 microns;
(e) adding the powder to water containing a wetting agent wherein the surface tension of the water is <30 dynes/cm; and
(f) adding rheology control agent.

DETAILED DESCRIPTION OF THE INVENTION

The present invention provides a method for the production of a powder slurry coating composition. The method comprises the steps of preparing a powder coating composition and then extruding the powder coating into a sheet. The sheet is cooled and then run through a kibbler to produce flakes of the coating. The flake is then jet milled. The flake can also be processed by first grinding in a hammer or air classifying mill (ACM) mill, followed by jet milling. During jet milling, at least 50% of the flake is reduced to a particle size of 3-5 microns, with the remaining particles having a maximum particle size of 10 microns.

The powder slurry is produced by adding the powder to water. Prior to the addition of the powder to water, surfactant is added to the water to reduce the surface tension of the water. Optimum particle wetting occurs with a surface tension of 30 dynes/cm or less. At a surface tension of greater than 30 dynes/cm the powder tends to float on water. An example of a suitable surfactant is Tergitol ® TMN-6, from Union Carbide, New York, N.Y. The surfactant is included in an amount between 0.05 and 4.0% by weight based on total slurry coating weight.

Following the addition of the powder coating to water, dispersants are added to keep the wetted powder from agglomerating. Suitable dispersants include anionic acrylic polymeric dispersing agents such as Tamol ® 731 or Tamol ® 850 (trademark of Rohm and Haas of Philadelphia, Pa.). The dispersant is added in an amount between 0.5 and 10.0% by weight, based on total slurry coating weight.

Rheology control agents may also be added to keep the powder suspended and provide the proper rheology for spray applications. The rheology control agent may be anionic, nonionic or cationic. The rheology control agent is determined by the composition of the powder coating, and such information is readily available to one skilled in the art. The rheology control agent is added in an amount between 0.50 and 3.0% by weight based on total slurry coating weight.

The resultant slurry is processed using a homogenizer to break up any remaining powder agglomerates. Typically, in production, an in line disperser is used to accomplish this. Following homogenization, the slurry is filtered to remove any foreign material from the slurry.

For purposes of the present invention, filtration is accomplished with a 400 mesh screen (38 microns).

Powder slurry coatings of the present invention may also be used to formulate primers and colored basecoats with metallic effects. Primer or other pigmented coatings are formulated by adding the necessary pigments during the dry mix step prior to extrusion. The process is as defined above for formulation of the powder slurry coating.

Metallic basecoat slurries are formulated as follows. First a powder slurry is formed as described above. A metallic slurry is formed by the addition of aluminum or mica to a mixture of water and the same surfactant as described above for the powder slurry. The aluminum or mica is added in amounts less than 40% by weight, based on total metallic slurry weight. When aluminum is utilized, to prevent gassing of the aluminum pigment caused by oxidation of the aluminum in the basic coating slurry, chromated or encapsulated aluminum pigment is utilized. The metallic slurry is stirred to remove agglomerates. The metallic slurry is then added to the powder coating slurry until the desired pigment to binder ratio is achieved. The powder coating slurry containing the metallic pigment is then filtered through a mesh screen. The screen size is determined by the size of metallic particles used. Rheology control agent is then added if necessary, to increase the viscosity of the coating to provide the desired metallic effect. The viscosity of the slurry is then adjusted for spray application of the slurry. If viscosity reduction is required water is used as the reduction solvent.

Coating compositions useful for purposes of the present invention include any suitable polymeric resin. These resins include acrylic resins, epoxy resins, amine modified resins, phenolic resins, saturated and unsaturated polyester resins, urea resins, urethane resins, blocked isocyanate resins and mixtures thereof.

Particularly preferred for purposes of the present invention are acrylic resins having a hydroxyl value of 20 to 120 and a number average molecular weight of 3,000 to 35,000 and a blocked isocyanate resin at a weight ratio of from 100/5 to 100/100, preferably from 100/10 to 100/50, especially preferably a composition in which the blocked isocyanate resin has an isocyanate equivalent of 100 to 2,000 and the mixing ratio of the acrylic resin and the blocked isocyanate resin is such that the ratio of the number of isocyanate groups to the number of hydroxyl groups is from 0.4 to 1.2.

Also preferred are compositions comprising an acrylic copolymer containing 0.5 to 50% by weight of glycidyl group containing monomer and at least one member selected from the group consisting of dibasic acids, polybasic acids and acid anhydrides. The polymeric coating compositions were prepared as set forth in the following examples.

Coatings were applied with a Binks siphon gun, Model No. 62. Panels were sprayed with coatings to a thickness of between 0.9 and 1.2 mils over cold rolled steel (CRS). Panels were given a ten minute air flash then prebaked for 10 minutes at 120° F., followed by a 30 minute bake at 350° F. The 10 minute prebake time serves to evaporate the water present. Once the water is evaporated, the powder slurry cures under the same conditions as the base powder from which it is made. Alternatively, panels were placed in a 130° F. oven without an air flash and dried for several minutes to remove water. The panels were then baked at 350° F. for 30 minutes. The resultant panels showed no evidence of solvent pop or outgassing.

The metallic powder slurry can be applied by spray or by electrostatic deposition. Typically the metallic coating slurry is applied over electrocoat. The metallic slurry composition is applied followed by a pre-bake of 10 minutes at 120° to 140° F. The panels were then baked for 30 minutes at 350° F. Lower cure materials can be made by adjustment to the powder formulation.

The method of the present invention avoids the use of co-solvents in combination with water, which necessitate a more gradual cure to prevent outgassing or solvent pop.

Powder slurry coating compositions as described herein are useful for both basecoat and clearcoat applications. The resultant coating compositions form smooth films with a high degree of gloss.

The invention is further illustrated by the following non-limiting examples.

EXAMPLES

Example 1

Preparation of Acrylic-Urethane Powder Coating for Use in Slurry Composition

The following Composition was utilized. All amounts are in percent by weight based on total powder coating composition weight.

| | |
|---|---|
| Acrylic Hydroxy Functional Resin[1] | 58.56 |
| IPDI Blocked Isocyanate[2] | 35.50 |
| Flow Agent[3] | 1.54 |
| Benzoin | 0.4 |
| UV Light Absorber[4] | 1.4 |
| Hindered Amine Light Stabilizer[5] | 2.6 |
| | 100.0% |

[1]Hydroxyl Functional Acrylic froms S. C. Johnson and Son, Racine, Wisconsin 53403.
[2]Vestagon ® B1065, Isophorone Diisocyanate adduct blocked with ε-caprolactam, from Hüls America, Piscattaway, New Jersey.
[3]Perenol ® F-30-P, from Henkel Corp., Ambler, Pennsylvania 19002.
[4]Uraflow ® B, from GCA Chemical, Bradenton, Florida 34205.
[5]Tinuvin ® 144, from Ciba Geigy Corp., Ardsley, New York 10502.

The acrylic urethane coating is prepared by dry mixing the raw materials using a Henchel or other suitable mixer. This is followed by melt mixing the dry ingredients through a suitable extruder such as a Warner and Pfliderer ZSK-30 extruder. The extrudate is then pressed into a sheet and cooled by chiller rolls. The resulting sheet is crushed into flakes.

Example 2

Pigmented Acrylic Powder Coating for Use in Slurry Composition

The following composition was utilized. All amounts are in percent by weight, based on total powder coating composition weight.

| | |
|---|---|
| Acrylic Hydroxy Functional Resin[1] | 38.85 |
| IPDI Blocked Isocyanate[2] | 23.55 |
| Flow Agent[3] | 1.2 |
| Benzoin | 0.4 |
| Titanium Dioxide | 35.5 |
| Carbon Black | 0.5 |

-continued

| | |
|---|---|
| | 100.0% |

[1] Hydroxyl Functional Acrylic from S. C. Johnson and Son, Racine, Wisconsin 53403.
[2] Vestagon ® B1065, Isophorone Diisocyanate adduct blocked with ε-caprolactam, from Hüls America, Piscattaway, New Jersey.
[3] Perenol ® F-30-P, from Henkel Corp., Ambler, Pennsylvania 19002.

The acrylic coating is prepared as described in Example 1.

Example 3

Glycidylmethacrylate Powder Coating for Use in Slurry Composition

The coating composition had the following composition. All amounts are in percent by weight, based on total powder coating weight.

| | |
|---|---|
| Glycidylmethacrylate resin[1] | 75.81 |
| 1,12 Dodecanoic Acid | 18.59 |
| Flow Agent[2] | 1.2 |
| Benzoin | 0.4 |
| UV Light Absorber[3] | 1.4 |
| Hindered Amine Light Stabilizer[4] | 2.6 |
| | 100.0% |

[1] Almatex ® Pd 7610, Anderson Development, Adrian, Michigan.
[2] Resimine ® RL-4[2], Mitsuitoatsu Chemicals, Osaka, Japan.
[3] Tinuvin ® 900 from Ciba Geigy Corp., Ardsley, New York 10502.
[4] Tinuvin ® 144, from Ciba Geigy Corp., Ardsley, New York 10502.

The coating composition was prepared as described in Example 1.

Example 4

Milling of Powder Coating Composition

Acrylic powder coating was fed into the feed hopper of the Model 100 Air Fluidized Grinding Mill and fed into the grind chamber via screw conveyor. The ground material was classified by a variable speed classifying wheel and a fixed cyclone chamber.

All particle size analyses were completed using a model 720 Cila Granulometre. The feed material consisted of large flakes approximately ½" in diameter and ⅛" thick.

In all tests grinding jets were pressurized to 6 bar and the grinding chamber pressure was maintained at 0 bar. All adjustments were made by changing the speed of the steel classifying wheel.

TABLE 1

| | | Particle Size Analysis | | |
|---|---|---|---|---|
| Tent | Classifying Wheel Speed | Particle Size | % of Sample at Particle Size | Median Particle Size |
| 1 | 10,000 | ≦10 microns | 98.4 | — |
| 2 | 12,000 | ≦10 microns | 99.6 | 3.68 |
| 3 | 14,000 | ≦10 microns | 100% | 3.60 |
| 4 | 15,000 | ≦10 microns | 100% | 3.14–3.33 |

Example 5

Preparation of Acrylic-Urethane Powder Slurry

All ingredients are added in amounts set forth below. Water and a wetting agent are combined. The acrylic-urethane flake comprising a powder where 50% of the powder has a particle size of between 3 and 5 microns, is then added to the water. Dispersant is then added to the mixture, followed by the addition of a rheology control agent.

Acrylic Urethane Powder Slurry Composition

| | |
|---|---|
| Deionized Water | 58.02 |
| Acrylic-Urethane Powder Coating[1] | 38.68 |
| Dispersant[2] | 0.60 |
| Surfactant[3] | 0.19 |
| Rheology Contol Agent[4] | 1.02 |
| Diethyl Ethanol Amine | 0.43 |

[1] As prepared in Example 1.
[2] Tamol ® 731 from Rohm and Haas, Philadelphia, Pa. 19105.
[3] Tergitol ® TMN-6 from Union Carbide, New York, N. Y.
[4] Acrysol ® ASE-60, from Rohm and Haas, Philadelphia, Pa. 19105.

All amounts are in percent by weight based on total slurry composition weight.

Example 6

Preparation of Metallic Powder Slurry Coating

A metallic slurry was prepared from the following.

| | |
|---|---|
| Chromated Aluminum Flake Pigment[1] | 51.4 grams |
| Chromated Aluminum Flake Pigment[2] | 51.4 grams |
| Deionized Water | 205.0 grams |
| Surfactant[3] | 0.3 grams |

[1] Chromated aluminum flake pigment from Obron Atlantic Corp., Painseville, Ohio.
[2] Chromated aluminum flake pigment from Obron Atlantic Corp., Painseville, Ohio.
[3] Tergitol ® TMN-6 from Union Carbide, New York, N.Y.[1]

The metallic slurry was formed by the addition of aluminum to a mixture of water and surfactant. The metallic slurry was stirred to remove agglomerates. The metallic slurry was then added to the powder coating slurry having the following composition.

| | |
|---|---|
| Acrylic Coating Composition from Ex. 2 | 283.5 grams |
| Deionized Water | 425.07 grams |
| Surfactant[1] | 0.2 grams |
| Dispersant[2] | 0.8 grams |
| Diethylethanolamine | 1.3 grams |
| Rheology Control Agent[3] | 2.73 grams |

[1] Tergitol ® TMN-6 from Union Carbide, New York, N. Y.
[2] Tamol ® 731 from Rohm and Haas, Philadelphia, Pa. 19105.
[3] Acrysol ® ASE-60, from Rohm and Haas, Philadelphia, Pa. 19105.

The coating composition was then filtered through a 325 mesh screen and reduced to a solids content of 50% for spray application.

Example 7

Application and Physical Properties of Applied Coating

Coatings as prepared in Example 2 were applied with a Binks siphon gun, Model No. 62 over CRS and black waterborne basecoat. Panels were given a ten minute air flash then prebaked for 10 minutes at 120° F., followed by a 30 minute bake at 350° F. Panels were sprayed with coatings to a thickness of between 0.9 and 1.2 mils over cold rolled steel (CRS). Coatings were very smooth and showed good gloss. Gloss results were as follows.

| Gloss on Polished Cold Rolled Steel | |
|---|---|
| 60° | 108.2 |
| 20° | 74.9 |

We claim:

1. A process for producing a powder slurry coating composition comprising
    (a) preparing a powder coating extrudate;
    (b) chilling and forming the coating extrudate into a sheet;
    (c) reducing the extrudate to a coating flake;
    (d) jet milling the flake to a powder, wherein at least 50% of the particles have a particle size of between 3 and 10 microns;
    (e) adding a wetting agent to water to reduce the surface tension of the water to <30 dynes/cm; and
    (f) adding the powder from (d) to the water and wetting agent, to form a powder slurry coating composition.

2. The process of claim 1, further comprising the step of grinding the coating flake from step (c) in a mill selected from the group consisting of a hammer mill and an air classifying mill, prior to the step of jet milling.

3. The process of claim 2, further comprising the step of adding a rheology control agent.

4. The process of claim 2, wherein the powder coating composition includes a resin selected from the group consisting of acrylic resins, epoxy resins, amine modified resins, phenolic resins, saturated and unsaturated polyester resins, urea resins, urethane resins, blocked isocyanate resins and mixtures thereof.

5. The process of claim 2, wherein the powder coating composition is selected from the group consisting of primer coating, basecoat and clearcoat compositions.

6. The process of claim 5, wherein a basecoat composition is utilized, further comprising the step of adding a slurry containing metallic pigment, water and surfactant to the basecoat composition.

7. The process of claim 1, further comprising the step of adding a rheology control agent.

8. The process of claim 3, wherein the rheology control agent is added in an amount between 0.50 and 3.0% by weight, based on total powder slurry coating composition weight.

9. The process of claim 1, further comprising the step of homogenizing the resultant powder slurry coating composition.

10. The process of claim 1, further comprising the step of filtering the resultant powder slurry coating composition.

11. The process of claim 1, wherein the powder slurry coating composition contains ≦40% powder by weight.

12. The process of claim 1, wherein the wetting agent is added in an amount between 0.05 and 0.4% by weight, based on total powder slurry coating composition weight.

13. The process of claim 1, wherein the powder coating composition includes a resin selected from the group consisting of acrylic resins, epoxy resins, amine modified resins, phenolic resins, saturated and unsaturated polyester resins, urea resins, urethane resins, blocked isocyanate resins and mixtures thereof.

14. The process of claim 1, wherein the powder coating composition is a clearcoat composition.

15. The process of claim 14, wherein the clearcoat composition includes an acrylic-urethane resin.

16. The process of claim 1, wherein the powder coating composition is a basecoat composition.

17. The process of claim 16, wherein the basecoat composition includes a acrylic-urethane resin.

18. The process of claim 17, further comprising the step of adding a slurry containing metallic pigment, water and surfactant to the basecoat composition.

19. The process of claim 18, wherein the slurry coating composition contains chromated or encapsulated aluminum pigment.

20. The process of claim 1, wherein the powder coating composition is a pigmented primer coating.

* * * * *